(12) United States Patent
Jin et al.

(10) Patent No.: US 11,487,669 B2
(45) Date of Patent: Nov. 1, 2022

(54) MEMORY SYSTEM FOR STORING DATA OF LOG-STRUCTURED MERGE TREE STRUCTURE AND DATA PROCESSING SYSTEM INCLUDING THE SAME

(71) Applicant: SK hynix Inc., Icheon (KR)

(72) Inventors: Yong Jin, Icheon (KR); Jung Ki Noh, Icheon (KR); Soon Yeal Yang, Icheon (KR)

(73) Assignee: SK HYNIX INC., Icheon (KR)

( * ) Notice: Subject to any disclaimer, the term of this patent is extended or adjusted under 35 U.S.C. 154(b) by 120 days.

(21) Appl. No.: 16/886,485

(22) Filed: May 28, 2020

(65) Prior Publication Data
US 2021/0182202 A1  Jun. 17, 2021

(30) Foreign Application Priority Data

Dec. 17, 2019 (KR) .......... 10-2019-0169138

(51) Int. Cl.
*G06F 12/0868* (2016.01)
*G06F 12/0811* (2016.01)
*G06F 12/0871* (2016.01)
*G06F 12/02* (2006.01)
*G06F 12/0873* (2016.01)

(52) U.S. Cl.
CPC ...... *G06F 12/0868* (2013.01); *G06F 12/0246* (2013.01); *G06F 12/0811* (2013.01); *G06F 12/0871* (2013.01); *G06F 12/0873* (2013.01); *G06F 2212/7201* (2013.01); *G06F 2212/7209* (2013.01)

(58) Field of Classification Search
None
See application file for complete search history.

(56) References Cited

U.S. PATENT DOCUMENTS

| 10,445,022 | B1 * | 10/2019 | Qui ....................... G06F 3/0608 |
| 2020/0183905 | A1 * | 6/2020 | Wang .................. G06F 16/2246 |
| 2020/0183906 | A1 * | 6/2020 | Spillane .................. G06F 16/86 |
| 2020/0320081 | A1 * | 10/2020 | Fanghaenel ........... G06F 16/172 |
| 2020/0356474 | A1 * | 11/2020 | Doddameti ......... G06F 11/3079 |
| 2020/0364189 | A1 * | 11/2020 | Lee ......................... G06F 21/64 |

FOREIGN PATENT DOCUMENTS

KR    20170057826 A    5/2017

\* cited by examiner

*Primary Examiner* — Charles Rones
*Assistant Examiner* — Ryan Dare

(57) ABSTRACT

A memory system includes a storage medium having a plurality of memory regions. A controller is configured to allocate each of a plurality of open memory regions among the memory regions to one or more levels and store, in response to a write request received from a host device that includes data and a level of the data, the data in an open memory region allocated to the level. A level may be a level of a file in a predetermined unit in which the data is included, such as in a log-structured merge (LSM) tree structure.

20 Claims, 10 Drawing Sheets

FIG.4

Before compaction

| LA | PA | Data |
|---|---|---|
| ⋮ | ⋮ | ⋮ |
| LA100 | PA500 | |
| ⋮ | ⋮ | <K1> {NEW1} <K2> {NEW2} ~KV1 |
| LA200 | PA600 | |
| ⋮ | ⋮ | ⋮ |
| LA1200 | PA850 | |
| ⋮ | ⋮ | <K1> {OLD1} <K2> {OLD2} ~KV2 |
| LA1300 | PA950 | |
| ⋮ | ⋮ | ⋮ |

After compaction

| LA | PA | Data |
|---|---|---|
| ⋮ | ⋮ | ⋮ |
| LA100 | PA500 | |
| ⋮ | ⋮ | Invalidated |
| LA200 | PA600 | |
| ⋮ | ⋮ | ⋮ |
| LA1200 | PA300 | |
| ⋮ | ⋮ | <K1> {NEW1} <K2> {NEW2} ~KV1 |
| LA1300 | PA400 | |
| ⋮ | ⋮ | ⋮ |

Write operation

FIG.8

Before compaction

| LA | PA | 데이터 | |
|---|---|---|---|
| ⋮ | ⋮ | ⋮ | |
| LA100 | PA500 | <K1> {NEW1}<br><K2> {NEW2} | ~KV1 |
| ⋮ | ⋮ | | |
| LA200 | PA600 | | |
| ⋮ | ⋮ | ⋮ | |
| LA1200 | PA850 | <K1> {OLD1}<br><K2> {OLD2} | ~KV2 |
| ⋮ | ⋮ | | |
| LA1300 | PA950 | | |
| ⋮ | ⋮ | ⋮ | |

Before compaction

| LA | PA | Data | |
|---|---|---|---|
| ⋮ | ⋮ | ⋮ | |
| LA100 | Unmapped | | |
| ⋮ | ⋮ | | |
| LA200 | Unmapped | | |
| ⋮ | ⋮ | ⋮ | |
| LA1200 | PA500 | <K1> {NEW1}<br><K2> {NEW2} | ~KV1 |
| ⋮ | ⋮ | | ↓Mapping change |
| LA1300 | PA600 | | |
| ⋮ | ⋮ | ⋮ | |

MEMORY SYSTEM FOR STORING DATA OF LOG-STRUCTURED MERGE TREE STRUCTURE AND DATA PROCESSING SYSTEM INCLUDING THE SAME

CROSS-REFERENCES TO RELATED APPLICATION

The present application claims priority under 35 U.S.C. § 119(a) to Korean application number 10-2019-0169138, filed on Dec. 17, 2019, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

A data processing system is an electronic or information system capable of processing data, and may include or be associated with a personal computer, a laptop computer, a smartphone, a tablet computer, a mobile device, a digital camera, a game console, a navigation system, a virtual reality device, a wearable device, etc.

The data processing system may include a memory system. The memory system may be configured to store data processed in the data processing system. The memory system can be part of a data processing system, or may be a separate system that is coupled to the data processing system. The memory system may be configured by or implemented by a Personal Computer Memory Card International Association (PCMCIA) card, a compact flash (CF) card, a smart media card, a memory stick, a multimedia card in the form of an MMC (MultiMediaCard), an eMMC (embedded MMC), a RS-MMC (Reduced-Size MMC) and a MMC-micro, a secure digital card in the form of an SD (Secure Digital) card, a mini-SD and a micro-SD, a universal flash storage (UFS), and/or a solid state drive (SSD).

SUMMARY

Various embodiments of the disclosure are directed to a memory system and a data processing system including the same, which can reduce write amplification, thereby improving the operation performance and extending the lifetime of the memory system.

In an embodiment, a memory system may include: a storage medium including a plurality of memory regions; and a controller configured to: allocate each open memory region of a plurality of open memory regions among the memory regions to one or more levels; receive a write request from a host device that includes data and a level for the data, the level being a level of a file in a predetermined unit in which data is included in a log-structured merge (LSM) tree structure; and store, in response to the received write request, the data in an open memory region allocated to the level.

In an embodiment, a memory system may include: a storage medium including a plurality of memory units corresponding to a plurality of physical addresses; and a controller configured to manage mapping relationships between the physical addresses and logical addresses, wherein, in response to a mapping change request received from a host device, the controller maps first physical addresses previously mapped to first logical addresses to second logical addresses.

In an embodiment, a data processing system may include: a storage medium including a plurality of memory regions; a controller configured to control the storage medium; and a host device configured to transmit a write request that includes a key-value pair and a level of the key-value pair to the controller, the level being a level of a file in a predetermined unit in which the key-value pair is included in a log-structured merge (LSM) tree structure, wherein the controller allocates each open memory region of a plurality of open memory regions among the memory regions to one or more levels and stores the key-value pair in an open memory region allocated to the level of the key-value pair in response to the write request.

BRIEF DESCRIPTION OF THE DRAWINGS

FIG. 4 is a diagram illustrating an example of a mapping change in a memory system in response to a compaction operation, according to an embodiment of the disclosure.

FIG. 8 illustrates an example mapping change performed without a write operation by a memory system according to an embodiment of the disclosure.

DETAILED DESCRIPTION

Figure 1:
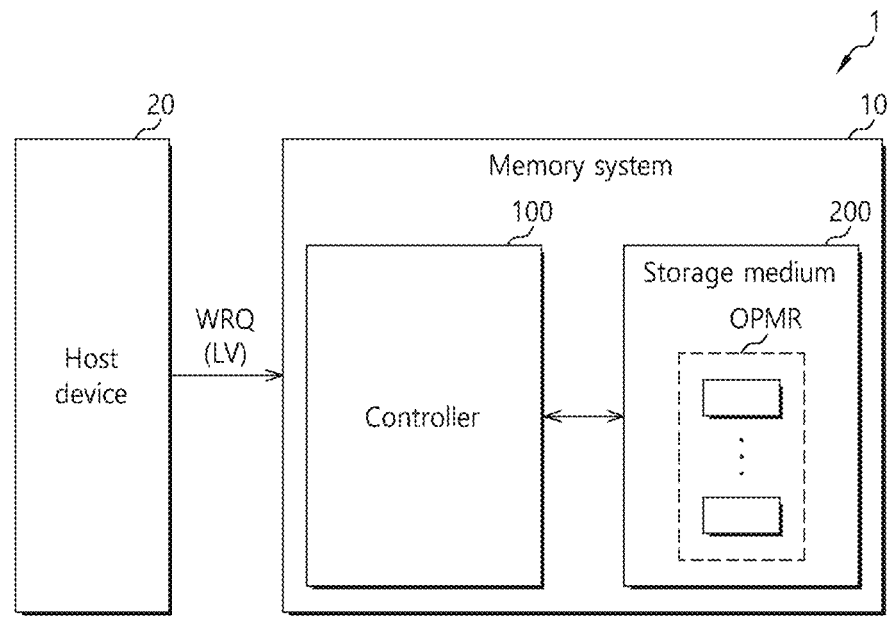
FIG. 1 illustrates an example of a data processing system including a memory system according to an embodiment of the disclosure.

In the present disclosure, advantages, features and methods for achieving them will become more apparent after a reading of the following exemplary embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

A memory system and a data processing system including a memory system is described herein with reference to the accompanying drawings through various examples and/or embodiments.

FIG. 1 illustrates a data processing system 1 that includes a memory system 10 in accordance with an embodiment of the disclosure.

The data processing system 1 is an electronic system capable of processing data, and may include or be implemented as part of a personal computer, a laptop computer, a smartphone, a tablet computer, a digital camera, a game console, a navigation system, a virtual reality device, a wearable device, etc.

The data processing system 1 may include a host device 20 and a memory system 10.

The host device 20 may control general operations of the data processing system 1. In some embodiments, the host device 20 allocates a level (LV) to data to be stored in the memory system 10, based on a database associated with the host device 20. For example, when transmitting a write request (WRQ) for data to the memory system 10, the host device 20 may transmit, along with the data, a level (LV) for the data. Further details regarding allocating data to a level (LV) of data are described herein with respect to FIG. 2.

The memory system 10 may be configured to store data in response to the write request (WRQ) of the host device 20. Also, the memory system 10 may be configured to provide data to the host device 20 in response to a read request of the host device 20. The memory system 10 may be part of the data processing system 1, or may be separate from and coupled to the data processing system 1.

The memory system 10 may be configured by a Personal Computer Memory Card International Association (PCM-CIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), and/or a solid state drive (SSD).

The memory system 10 may include a controller 100 and a storage medium 200. In an embodiment, the controller 100 is a digital circuit that manages the flow of data going to and from the storage medium 200. The controller may be formed on a chip independently or integrated with one or more other circuits.

The controller 100 may control general operations of the memory system 10. The controller 100 may control the storage medium 200 to perform foreground operations, according to instructions received from the host device 20. The foreground operations may include operations of writing data to the storage medium 200 and reading data from the storage medium 200, based on the instructions provided by the host device 20.

Further, the controller 100 may control the storage medium 200 to perform background operations useful to the storage medium, without any instructions received from the host device 20. For example, the background operations may include a wear leveling operation, a garbage collection operation, an erase operation, a read reclaim operation, and/or a refresh operation performed for the storage medium 200. Similar to the foreground operations, the background operations may include operations of writing data to the storage medium 200 and/or reading data from the storage medium 200.

The controller 100 may store data in one or more open memory regions (OPMR) of the storage medium 200 based on the level (LV) included in the write request (WRQ) associated with the data. For example, the controller 100 may allocate each of the open memory regions (OPMRs) to one or more levels, and may store write-requested data to an open memory region (OPMR) that is allocated to the level (LV) of the data. Thus, each of the open memory regions (OPMRs) may store data with similar attributes, improving the performance of the memory system 10, among other benefits.

According to some embodiments, the controller 100 determines a storage capacity for each open memory region (OPMR) based on the one or more levels allocated to the open memory region (OPMR). For example, when one or more levels allocated to a first open memory region are lower than one or more levels allocated to a second open memory region, the controller 100 sets a storage capacity of the first open memory region to be larger or greater than a storage capacity of the second open memory region.

The storage medium 200 may store the data transmitted from the controller 100, and may read stored data and transmit the read data to the controller 100, in response to instructions received from the controller 100.

The storage medium 200 may include one or more nonvolatile memory devices. A nonvolatile memory device may include a flash memory device such as a NAND flash or a NOR flash, a FeRAM (ferroelectric random access memory), a PCRAM (phase change random access memory), an MRAM (magnetic random access memory), an ReRAM (resistive random access memory), and other devices.

A nonvolatile memory device may include one or more planes, one or more memory chips, one or more memory dies, and/or one or more memory packages.

The storage medium 200 may include the open memory regions (OPMRs). Each open memory region (OPMR) may store data to one or more levels allocated to the OPMR. Each open memory region (OPMR) may not store data to levels not allocated to the OPMR. Further details regarding the open memory regions (OPMRs) are described herein with respect to FIG. 5.

Figure 2:
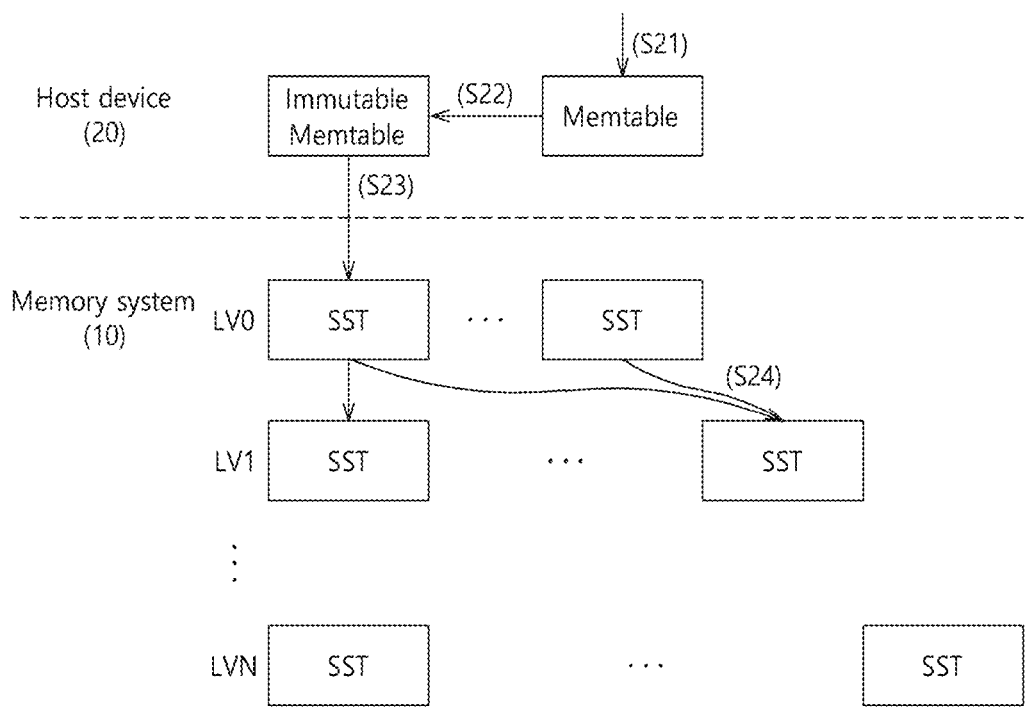
FIG. 2 illustrates an example of data management performed by a host device according to an embodiment of the disclosure.

FIG. 2 illustrates an example of data management performed by the host device 20 of FIG. 1 according to an embodiment of the disclosure.

The host device 20 may manage data via an embedded database, such as RocksDB or other database management systems (DBMSs). For example, the host device 20 may operate with various NoSQL databases, with a Key-Value Store structure, with a log-structured merge (LSM) tree structure, and/or with other database management systems, databases, or data structures.

As depicted in FIG. 2, at step S21, when data is generated, the host device 20 may input a key and value (e.g., a key-value pair) in a memtable of memory (not illustrated) inside the host device 20. The memtable may be a table structure configured by key-value pairs. The memtable may include a plurality of key-value pairs.

At step S22, when the memtable is full (e.g., the memtable reaches a predetermined capacity), the host device 20 may change or convert the memtable to an immutable memtable in which it is impossible to change data. The host device 20 may generate a new memtable for the input of a key-value pair.

At step S23, the host device 20 may sort the immutable memtable based on keys, and may store the immutable memtable in the memory system 10 as a file (e.g., a sorted static table (SST) file) in a predetermined unit at a level 0 (LV0) of the memory system 10. Thus, the SST file stored in the memory system 10 may be data in level 0 of the memory system 10.

As the steps S21 to S23 are repeated, the host device 20 stores additional SST files to the level 0 of the memory system 10. When the number of SST files in the level 0 (LV0) reaches a predetermined value, at step S24, the host device 20 may perform a compaction operation on the SST files in the level 0 (LV0) of the memory system 10. For example, the host device 20 may merge the SST files of the level 0 (LV0) with the SST files of the level 1 (LV1) through the compaction operation, converting the SST files of the level 0 (LV0) into SST files of the level 1 (LV1). In addition, the host device 20 may perform a compaction operation for SST files in each and every level (e.g., LV1 to LVN) of the memory system 10, as described in step S24.

In some embodiments, some or all of the levels have different storage capacities (e.g., capacity to store SST files), where a comparatively higher level has a storage capacity larger or greater than a comparatively lower level in the memory system 10. For example, the level 0 (LV0), the highest level, has a larger or greater storage capacity than any lower level (e.g., LV1, LV2 to LVN).

The memory system 10 can include various levels or configurations. For example, the number of levels (LV0 to LVN), the size of an SST file, and so forth, may be determined when the database of the host device 20 is designed.

Figure 3:
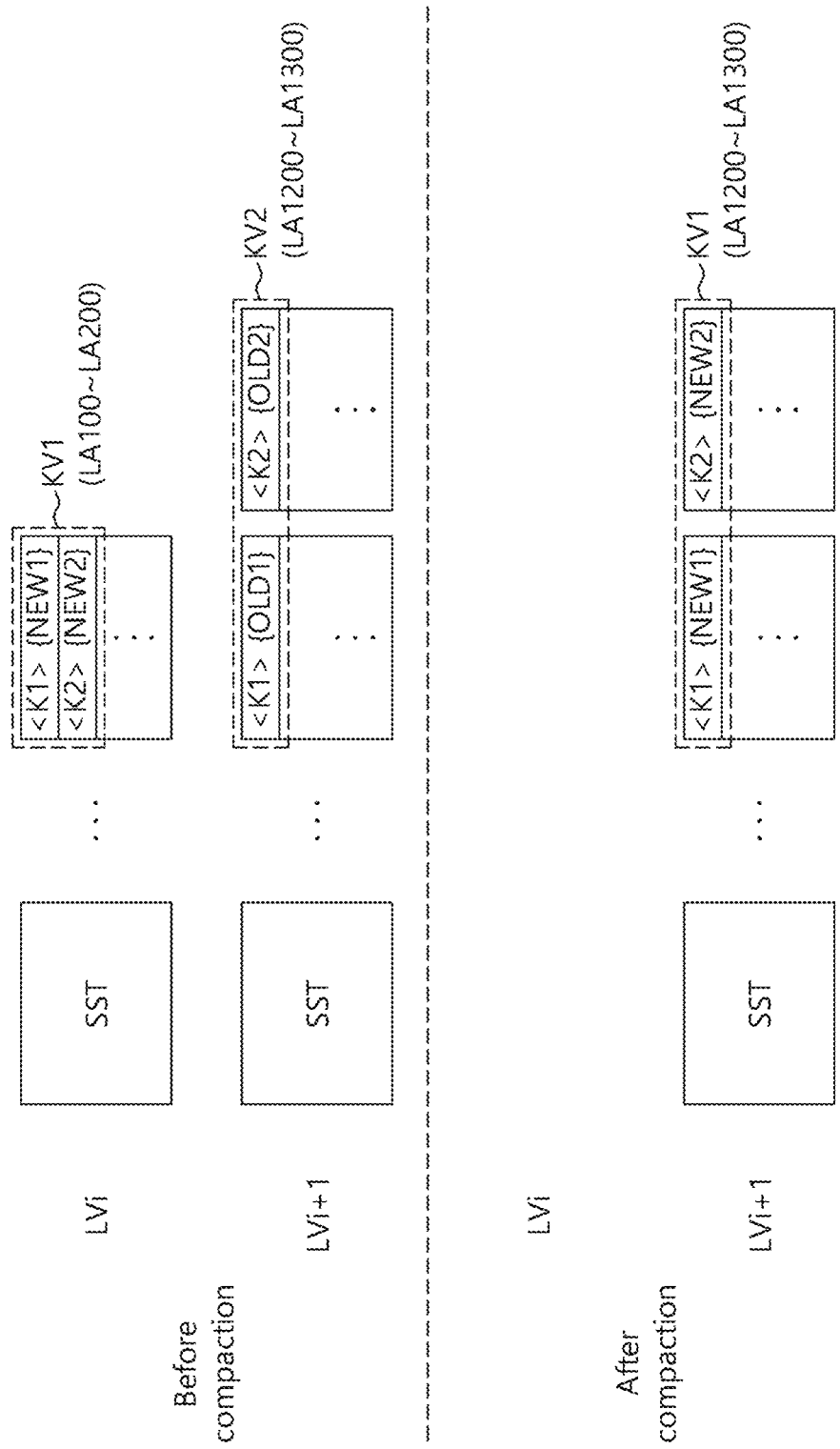
FIG. 3 illustrates an example of a compaction operation between levels of a memory system according to an embodiment of the disclosure.

FIG. 3 illustrates a compaction operation performed from a level i (LVi) to a level i+1 (LVi+1) in accordance with an embodiment of the disclosure.

Referring to FIG. 3, "<>" of the SST file indicates a key, and "{ }" indicates a value. Before compaction, when an SST file stored in the level i (LVi) and an SST file stored in the level i+1 (LVi+1) each include key-value pairs having the same key, the values of the level i (LVi) as a higher level may be new data, and the values of the level i+1 (LVi+1) as a lower level may be old data. For example, for a key K1, a value NEW1 of the level i (LVi) may be new data, and a value OLD1 of the level i+1 (LVi+1) may be old data. Also, for a key K2, a value NEW2 of the level i (LVi) may be new data, and a value OLD2 of the level i+1 (LVi+1) may be old data.

Before compaction, key-value pairs KV1 stored in the level i (LVi) may correspond to logical addresses LA100 to LA200. In other words, the key-value pairs KV1 are allocated with the logical addresses LA100 to LA200 and stored in the memory system 10.

Key-value pairs KV2 of the level i+1 (LVi+1) may correspond to logical addresses LA1200 to LA1300. In other words, the key-value pairs KV2 are allocated with the logical addresses LA1200 to LA1300 and stored in the memory system 10.

When the number of SST files of the level i (LVi) reaches a predetermined or threshold value, the SST files of the level i (LVi) may be merged with SST files of the level i+1 (LVi+1) through a compaction operation. For example, a key-value pair having the same key at the level i+1 (LVi+1) may be replaced with a key-value pair of the level i (LVi). For example, the key-value pairs KV2 of the level i+1 (LVi+1) may be replaced with the key-value pairs KV1 of the level i (LVi). Thus, after the compaction operation, the key-value pairs KV1 of the level i+1 (LVi+1) may correspond to the logical addresses LA1200 to LA1300.

FIG. 4 illustrates an example mapping change in the memory system 10 after performance of a compaction operation (e.g., the compaction operation described with respect to FIG. 3), in accordance with an embodiment of the disclosure.

Referring to FIG. 4, the controller 100 may map physical addresses (PA) to logical addresses (LA) and manage mapping relationships between addresses and/or between the memory system 10 and the storage medium 200.

As described herein, each logical address (LA) may be an address which is allocated to data by the host device 20. When storing data in the memory system 10, the host device 20 may transmit the data and a logical address (LA) allocated to the data in the memory system 10.

Each physical address (PA) may be an address of a memory unit where data is stored in the storage medium 200. Thus, when storing data in or to the storage medium 200, the controller 100 may map a logical address (LA) with a physical address (PA) for the data. Then, when the host device 20 requests the data using the logical address (LA), the controller 100 may read the data from the storage medium 200 based on the mapping between the physical address (PA) and the logical address (LA), and may transmit the data read from the storage medium 200 to the host device 20.

Before compaction by the host device 20, logical addresses LA100 to LA200 are mapped to physical addresses PA500 to PA600. For example, key-value pairs KV1 corresponding to the logical addresses LA100 to LA200 may be stored in memory units corresponding to the physical addresses PA500 to PA600 in the storage medium 200.

Further, logical addresses LA1200 to LA1300 are mapped to physical addresses PA850 to PA950. For example, key-value pairs KV2 corresponding to the logical addresses LA1200 to LA1300 may be stored in memory units corresponding to the physical addresses PA850 to PA950 in the storage medium 200.

When the host device 20 performs the compaction operation, where data corresponding to the logical addresses LA1200 to LA1300 are changed to the key-value pairs KV1, the host device 20 may transmit the write request (WRQ) to the memory system 10. In response to the write request (WRQ) received from the host device 20, the controller 100 may perform a write operation to store the key-value pairs KV1 in new memory units corresponding to physical addresses PA300 to PA400 in the storage medium 200, and may map the logical addresses LA1200 to LA1300 to the physical addresses PA300 to PA400 of the new memory units.

Further, the controller 100 may invalidate data stored in the memory units corresponding to the physical addresses PA500 to PA600 (e.g., the key-value pairs (KV1) of the level i (LVi)), under the control of the host device 20. Also, while not illustrated, the controller 100 may invalidate data stored in the memory units corresponding to the physical addresses PA850 to PA950 (e.g., the key-value pairs KV2 of the level i+1 (LVi+1)), under the control of the host device 20.

While the host device 20 performs the compaction operation, the memory system 10 may undergo increased and undesirable write amplification. Write amplification can occur in solid-state drives and flash memory, where amounts of information written to storage media (e.g., storage medium 200) are a multiple of the logical amounts of information to be written.

For example, the memory system 10 stores the data stored in the memory units having the physical addresses PA500 to PA600, and in memory units having the physical addresses PA300 to PA400. However, the memory system 10 may also store again data which has not been actually changed.

Also, the write amplification of the memory system 10 may generally increase as the size of a single SST file increases. If a background operation of the memory system 10, such as a garbage collection operation (e.g., an operation of reading and rewriting data), is also performed, the write amplification of the memory system 10 may further increase. When the write amplification increases, the performance of the memory system 10 may degrade, and the wear of the storage medium 200 may accelerate, thereby shortening the lifetime of the memory system 10, among other drawbacks.

Figure 5:
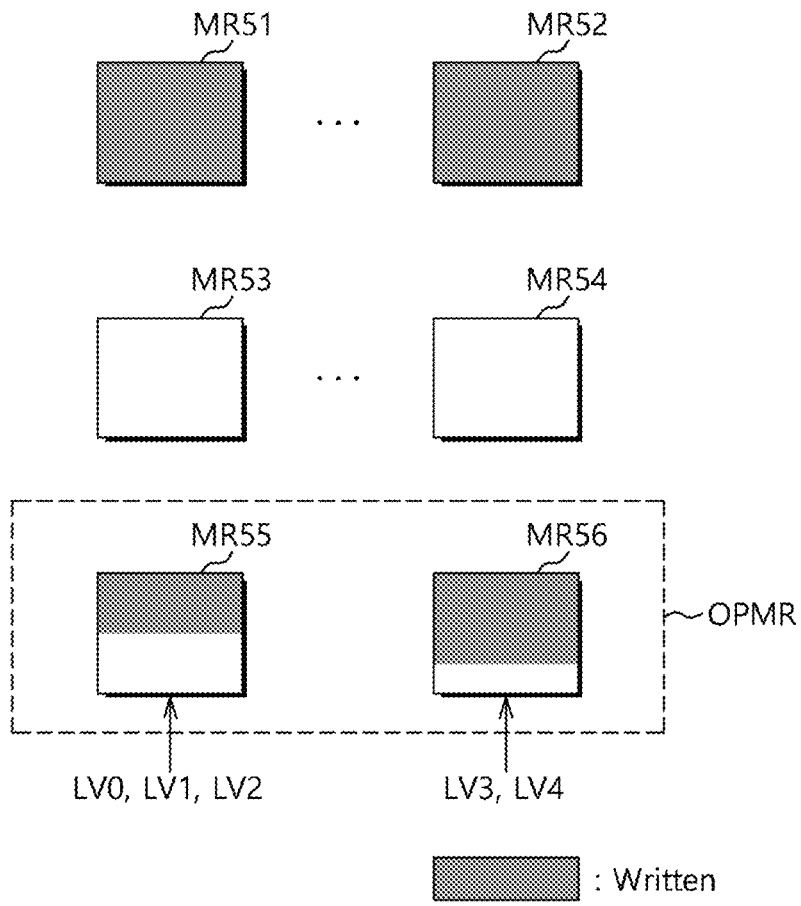
FIG. 5 illustrates an example of a method of allocating open memory regions to levels according to an embodiment of the disclosure.

FIG. 5 illustrates an example of a method of allocating open memory regions (OPMRs) to levels in accordance with an embodiment of the disclosure.

The controller 100 may manage a plurality of memory regions in the storage medium 200. A memory region may be a logical memory unit. Each memory region may be formed over a plurality of nonvolatile memory devices, which are included in the storage medium 200. Each memory region may be formed to include one or more memory blocks included in each of the plurality of nonvolatile memory devices. Each memory region may be formed to include memory blocks, which are included in each of the plurality of nonvolatile memory devices and have the same block addresses. A memory block may be an erase unit of a nonvolatile memory device. Each memory block may include a plurality of memory units, which may be identified by physical addresses.

Each of the memory regions may include a plurality of memory cells. Memory cells with storage capacities from 1 bit to 4 bits are referred to as a single level cell (SLC), a multi-level cell (MLC), a triple level cell (TLC) and a quadruple level cell (QLC), respectively. The controller 100 may determine a storage capacity for memory cells of a memory region, and may store data in the memory region up to the determined storage capacity.

Referring to FIG. 5, memory regions MR51 to MR52 are full of data (e.g., store data to a determined storage capacity) and each have no empty space or available capacity. Memory regions MR53 to MR54 are empty and available to store data. Memory regions MR55 and MR56 are open memory regions (OPMRs), and may be used to store data.

The controller 100 may simultaneously use a plurality of open memory regions (OPMRs), such as MR55 and MR56 of FIG. 5. The controller 100 may allocate each of the open memory regions (OPMRs) to one or more levels before starting to use the open memory regions (OPMRs). For example, the open memory region MR55 may be allocated to levels LV0, LV1 and LV2, and the open memory region MR56 may be allocated to levels LV3 and LV4.

The controller 100 may store data (e.g., key-value pairs) of corresponding levels, to each of the open memory regions (OPMRs). For example, when receiving the write request (WRQ) depicted in FIG. 1 from the host device 20, the controller 100 may check a level (LV) of data included or identified in the write request (WRQ), and may determine an open memory region (OPMR) to store the data, among the open memory regions (OPMRs).

Thus, in an embodiment, the data transmitted from the host device 20 to the memory system 10 is stored in the open memory region (OPMR) is allocated to the level (LV) associated and/or identified within the write request (WRQ). For example, data associated with levels LV0, LV1 and LV2 may be stored to the open memory region MR55, which is allocated to levels LV0, LV1, and LV2, and data associated with the levels LV3 and LV4 may be stored to the open memory region MR56, which is allocated to the levels LV3 and LV4.

According to an embodiment, the controller 100 may determine the number of open memory regions (OPMRs) to be used simultaneously, depending on a size of a single SST file. Thus, as a size of a single SST file is greater, the controller 100 may use more or a greater number of open memory regions.

For example, when a single SST file is 64 kb, the controller 100 may use two open memory regions MR55 and MR56, as illustrated in FIG. 5. As another example, when a single SST file is 256 kb, the controller 100 may use three open memory regions (a first, second, and third memory region). Following the example, the first open memory region may correspond to a level 0 and a level 1, the second open memory region may correspond to a level 2 and a level 3, and the third open memory region may correspond to a level 4.

According to an embodiment, the total number of open memory regions (OPMRs) simultaneously used in the storage medium 200 may be equal to or less than the total number of levels managed by the host device 20.

According to an embodiment, the host device 20 may transmit database information to the memory system 10. The database information may include a size of a single SST file and the total number of levels included in an LSM tree structure. The controller 100 may determine the number of open memory regions (OPMRs) to be simultaneously used and may determine the levels to allocate to each of the open memory regions (OPMRs) based on the database information transmitted from the host device 20.

As a result, data stored in each of the open memory regions (OPMRs) may have similar attributes. As described herein, because data stored at a higher level is new data, and data stored at a lower level is old data, data stored in the open memory region MR55 may be newer than data stored in the open memory region MR56.

Figure 6:
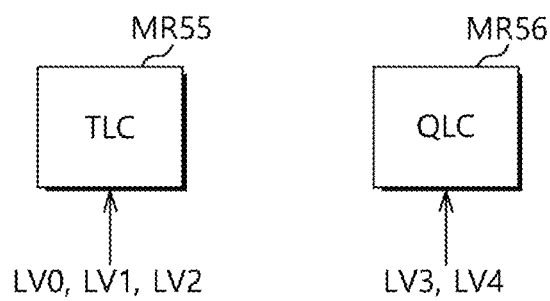
FIG. 6 illustrates an example of storage capacities of open memory regions according to an embodiment of the disclosure.

FIG. 6 illustrates an example of storage capacities of open memory regions MR55 and MR56 in accordance with an embodiment of the disclosure.

Referring to FIG. 6, the controller 100 may determine a storage capacity of each of the open memory regions, MR55 and MR56, based on the levels allocated to each of the open memory regions MR55 and MR56. For example, because the levels LV3 and LV4 allocated to the open memory region MR56 are lower than the levels LV0, LV1 and LV2 allocated to the open memory region MR55, the controller 100 may set the open memory region MR56 to have a larger storage capacity than the open memory region MR55.

For example, the controller 100 may use memory cells of the open memory region MR55 as TLCs (triple-level cells) and may use memory cells of the open memory region MR56 as QLCs (quad-level cells).

As described herein, because open memory region MR55 is allocated to higher levels, relatively new data and a smaller number of SST files will be stored in the open memory region MR55. On the other hand, relatively old data and a larger number of SST files will be stored in the open memory region MR56, because it is allocated to lower levels. Therefore, assigning a different storage capacity for each level increases the provisioning of data within the memory system 10, which enables an efficient use of the capacity of the memory system 10, among other benefits.

Figure 7:
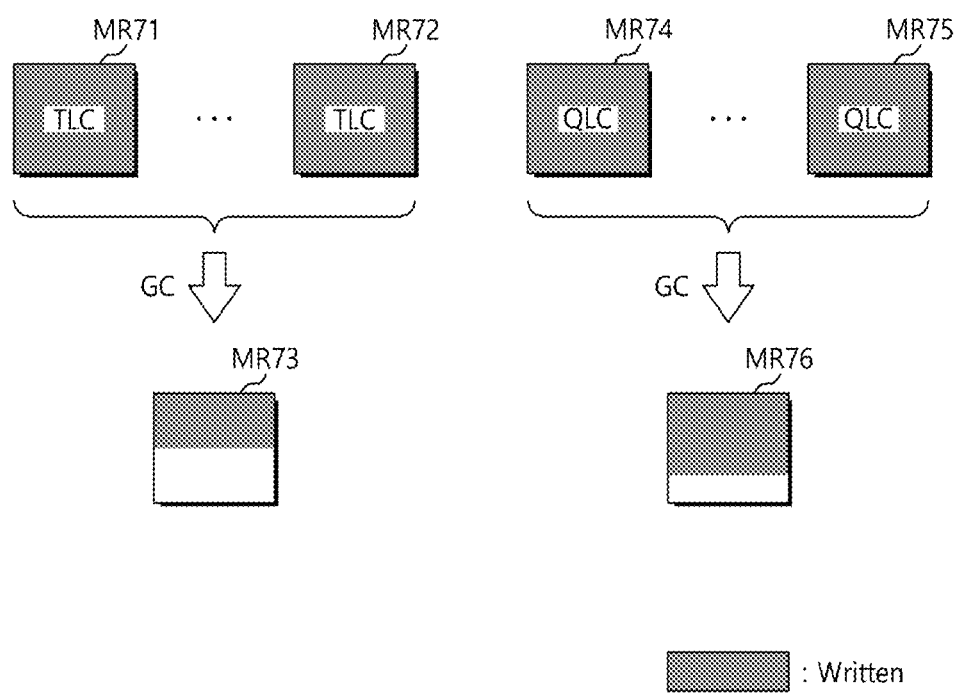
FIG. 7 illustrates an example garbage collection operation performed by a controller according to an embodiment of the disclosure.

FIG. 7 illustrates an example garbage collection operation (GC) performed by the controller 100 in accordance with an embodiment of the disclosure.

Referring to FIG. 7, the controller 100 may perform the garbage collection operation (GC) of storing valid data, stored in one or more source memory regions, into a destination memory region and erasing the data stored in the source memory regions. To begin, the controller 100 may perform the garbage collection operation (GC) by dividing source memory regions for respective storage capacities. In some cases, the controller 100 may select only memory regions that have the same storage capacity as source memory regions to be merged into the same destination memory region.

For example, the controller 100 may select memory regions MR71 to MR72, which have the same storage capacity, as source memory regions to be merged into a common destination memory region MR73. Also, the controller 100 may select memory regions MR74 to MR75, which have the same storage capacity, as source memory regions to be merged into a common destination memory region MR76. Thus, even after the garbage collection operation (GC) is performed, all the data stored in each destination memory region will have similar attributes.

In an embodiment, the division of source memory regions based on respective storage capacities may include the division of source memory regions based on the levels of stored data. The controller 100 may select memory regions storing data at the same levels as source memory regions to be merged into the same destination memory region. For example, referring to both FIGS. 6 and 7, the memory regions MR71 to MR72 store data having the same levels LV0, LV1 and LV2 and thus may be selected as source memory regions to be merged into the same destination memory region MR73. Also, the memory regions MR74 to MR75 store data having the same levels LV3 and LV4 and thus may be selected as source memory regions to be merged into the same destination memory region MR76.

In some cases, managing data having similar attributes, such as by storing data having similar attributes into the same destination memory region, can assist in improving the performance of the memory system 10. For example, the cost of the garbage collection operation (GC) may be reduced, because data having similar attributes are invalidated at similar speeds.

While FIG. 7 illustrates a garbage collection operation (GC) where the source memory regions MR71 to MR72 and MR74 to MR75 are divided into two groups and are merged into two destination memory regions MR73 and MR76, any or all number of source memory regions or destination memory regions are contemplated. For example, in operations where k number of open memory regions are simultaneously used, the source memory regions may be divided into k number of groups and may be merged into k number of destination memory regions.

FIG. 8 illustrates a representation of an example mapping change performed by the memory system 10 without a write operation when the compaction operation of FIG. 3 is performed, in accordance with an embodiment of the disclosure.

Referring to FIG. 8, the host device 20 may transmit a mapping change request to the memory system 10 to match the key-value pairs KV1 corresponding to the logical addresses LA100 to LA200 to the logical addresses LA1200 to LA1300. The mapping change request transmitted by the host device 20 may include the logical addresses LA100 to LA200 and the logical addresses LA1200 to LA1300.

In response to receiving the mapping change request from the host device 20, the controller 100 may map the physical addresses PA500 to PA600, originally mapped to the logical addresses LA100 to LA200, to the logical addresses LA1200 to LA1300. The data (e.g., the key-value pairs KV1) stored in the memory units corresponding to the physical addresses PA500 to PA600 may be effectively maintained (e.g., maintained in a valid state) when mapped to the logical addresses LA1200 to LA1300.

Further, the controller 100 may un-map or cancel the mapping relationship between the logical addresses LA100 to LA200 and the physical addresses PA500 to PA600.

Also, while not illustrated, in response to receiving the mapping change request, the controller 100 may invalidate the data (e.g., the key-value pairs KV2 of the level i+1 (LVi+1)) stored in the memory units corresponding to the physical addresses PA850 to PA950. In some embodiments, the controller 100 may invalidate the key-value pairs KV2 of the level i+1 (LVi+1) during a control operation performed by the host device 20 separate from the mapping change request and/or associated mapping change operation.

Thus, some write operations normally performed during mapping change operations can be omitted. For example, the write operation on the key-value pairs KV1 for the physical addresses PA300 to PA400, performed as illustrated in FIG. 4, may be omitted. Therefore, the memory system 10 may realize a successful compaction result by the host device 20 on the storage medium 200 without performing a write operation to the storage medium 200.

Thus, the memory system 10 can omit an unnecessary write operation. By omitting the write operation, the memory system 10 reduces the write amplification due to write operations, improving the performance of the memory system 10 and extending the lifetime of the memory system 10, among other benefits.

Figure 9:
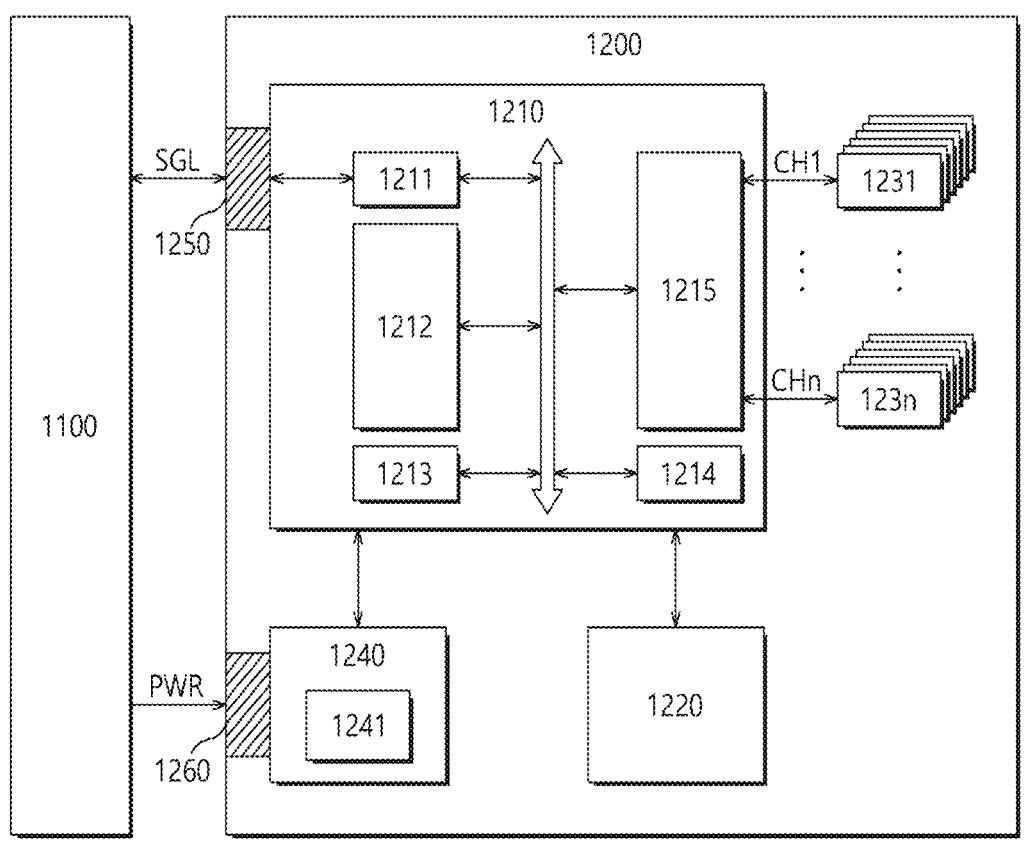
FIG. 9 illustrates a data processing system including a solid state drive (SSD) in accordance with an embodiment of the disclosure

FIG. 9 illustrates a data processing system 1000 including a solid state drive (SSD) 1200 in accordance with an embodiment. Referring to FIG. 9, the data processing system 1000 may include a host device 1100 and the SSD 1200.

The host device 1100 may be configured in the same manner as the host device 20 shown in FIG. 1.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may be configured in the same manner as the controller 100 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal (SGL) with the host device 1100 through the signal connector 1250. The signal (SGL) may include a command, an address, data, and so on. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and/or universal flash storage (UFS).

The control unit 1212 may analyze and process the signal (SGL) received from the host device 1100. The control unit 1212 may control operations of internal function blocks according to firmware or software for driving the SSD 1200. The random access memory 1213 may be used as a working memory for driving the firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control instructions from the control unit 1212. For example, the memory interface unit 1215 may provide the data stored in the buffer memory device 1220 to at least one of the nonvolatile memory devices 1231 to 123n, or provide the data read from at least one of the nonvolatile memory devices 1231 to 123n to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control instructions from the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power (PWR) inputted through the power connector 1260 to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 10:
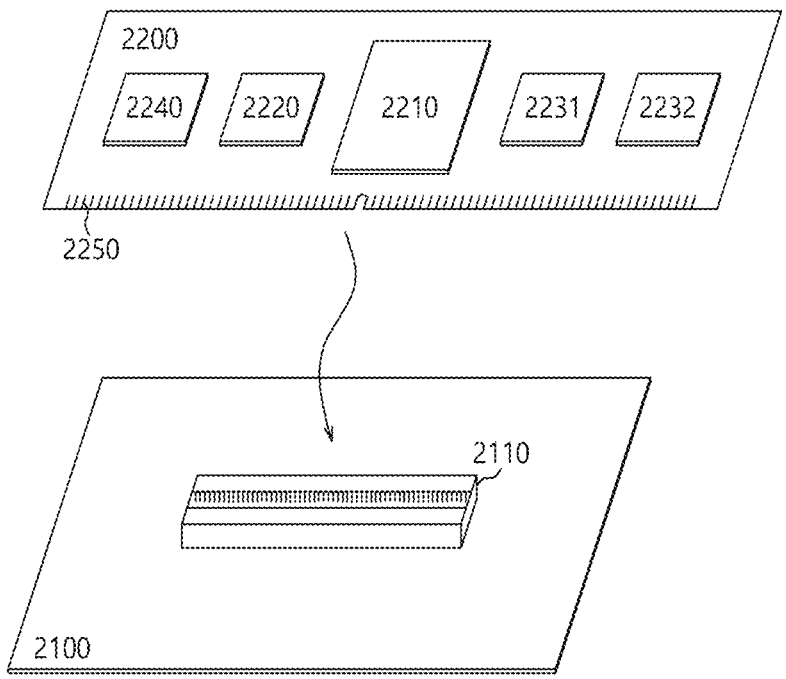
FIG. 10 illustrates a data processing system including a memory system according to an embodiment of the disclosure.

FIG. 10 illustrates a data processing system 2000 including a memory system 2200 in accordance with an embodiment. Referring to FIG. 10, the data processing system 2000 may include a host device 2100 and the memory system 2200.

The host device 2100 may be configured in the form of a board, such as a printed circuit board. Although not shown, the host device 2100 may include internal function blocks for performing the functions of a host device.

The host device 2100 may include a connection terminal 2110 such as a socket, a slot, or a connector. The memory system 2200 may be mounted to the connection terminal 2110.

The memory system 2200 may be configured in the form of a board, such as a printed circuit board. The memory system 2200 may be a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 9.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250 to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so on and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 11:
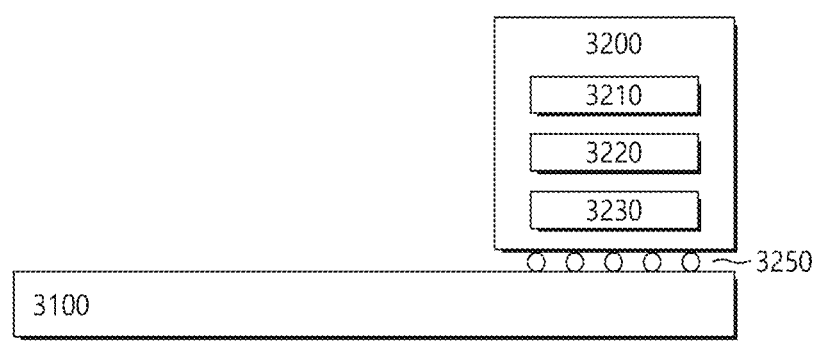
FIG. 11 illustrates a data processing system including a memory system according to an embodiment of the disclosure.

FIG. 11 illustrates a data processing system 3000 including a memory system 3200 in accordance with an embodiment. Referring to FIG. 11, the data processing system 3000 may include a host device 3100 and the memory system 3200.

The host device 3100 may be configured in the form of a board, such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 9.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control instructions from the controller 3210.

The nonvolatile memory device 3230 may be used as the storage medium of the memory system 3200.

Figure 12:
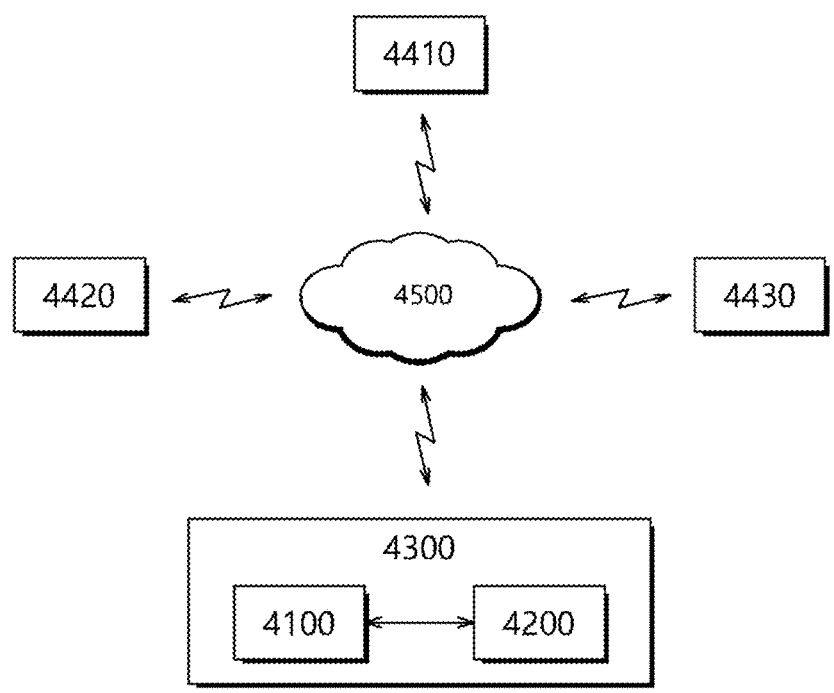
FIG. 12 illustrates a network system including a memory system according to an embodiment of the disclosure.

FIG. 12 is a diagram illustrating a network system 4000 including a memory system 4200 in accordance with an embodiment. Referring to FIG. 12, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. As another example, the server system 4300 may provide data to the plurality of client systems 4410 to 4430.

The server system 4300 may include a host device 4100 and the memory system 4200. The memory system 4200 may be similar to the memory system 100 shown in FIG. 1, the memory system 1200 shown in FIG. 9, the memory system 2200 shown in FIG. 10, and/or the memory system 3200 shown in FIG. 11.

Figure 13:
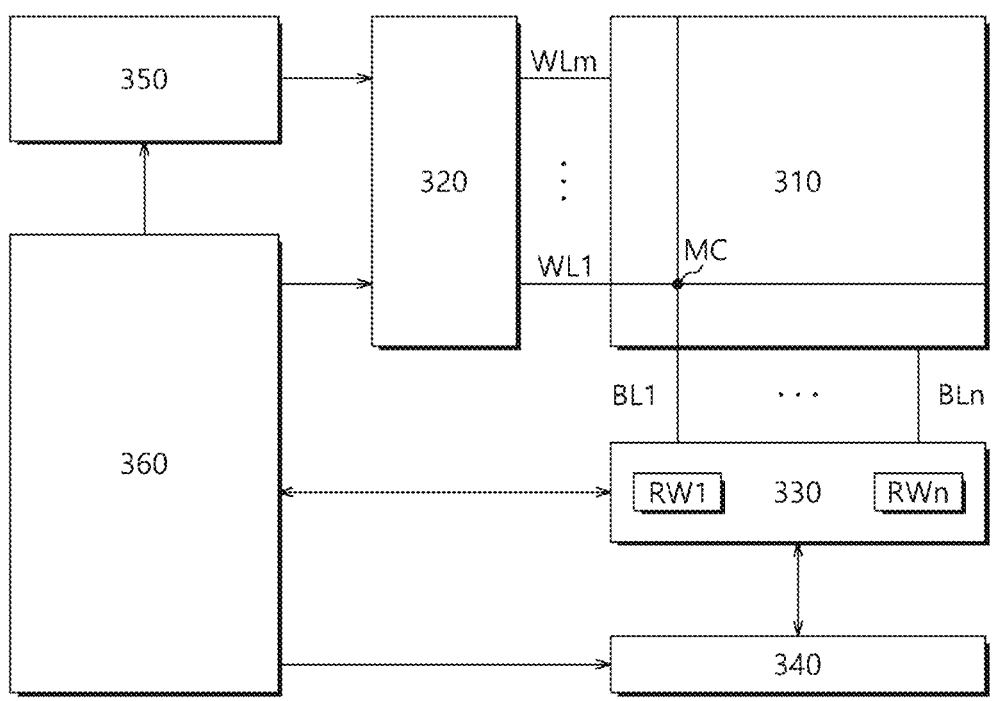
FIG. 13 illustrates a nonvolatile memory device included in a memory system according to an embodiment of the disclosure.

FIG. 13 illustrates a nonvolatile memory device 300 included in a memory system in accordance with an embodiment. Referring to FIG. 13, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control instructions from the control logic 360. The row decoder 320 may decode an address provided from an external device (not shown). The row decoder 320 may select and drive the word lines WL1 to WLm based on a decoding result. For example, the row decoder 320 may provide a word line voltage provided from the voltage generator 350 to the word lines WL1 to WLm.

The data read/write block 330 may be coupled with the memory cell array 310 through the bit lines BL1 to BLn. The data read/write block 330 may include read/write circuits RW1 to RWn, which correspond to the bit lines BL1 to BLn, respectively. The data read/write block 330 may operate according to control instructions from the control logic 360. The data read/write block 330 may operate as a write driver or a sense amplifier according to various operation modes. For example, the data read/write block 330 may operate as a write driver, which stores data provided from the external device into the memory cell array 310 in a write operation. As another example, the data read/write block 330 may operate as a sense amplifier, which reads out data from the memory cell array 310 in a read operation.

The column decoder 340 may operate according to control instructions from the control logic 360. The column decoder 340 may decode an address provided from the external device. The column decoder 340 may couple the read/write circuits RW1 to RWn of the data read/write block 330 that correspond to the bit lines BL1 to BLn, respectively, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated by a program operation may be applied to a word line of memory cells for which the program operation is to be performed. As another example, an erase voltage generated by an erase operation may be applied to a well area of memory cells for which the erase operation is to be performed. As another example, a read voltage generated by a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the memory system and the data processing system including the same described herein should not be limited based on the described embodiments.

What is claimed is:

1. A memory system, comprising:
   a storage medium including a plurality of memory regions, wherein each of the plurality of memory regions is a unit selected as a source memory region in which data stored therein moves together in a garbage collection operation; and
   a controller configured to:
      allocate each open memory region of a plurality of open memory regions among the plurality of memory regions to one or more levels;
      receive a write request from a host device that includes data and a level for the data, the level being a level of a file in a predetermined unit in which data is included in a log-structured merge (LSM) tree structure; and
      store, in response to the received write request, the data in an open memory region allocated to the level, wherein the open memory region does not store data having a level other than the one or more levels allocated to the open memory region.

2. The memory system according to claim 1, wherein the controller determines a storage capacity of each of the open memory regions based on the one or more levels allocated to each of the open memory regions.

3. The memory system according to claim 2, wherein, when one or more levels to which a first open memory region is allocated are lower than one or more levels to which a second open memory region is allocated, the controller sets a storage capacity of the first open memory region to be larger than a storage capacity of the second open memory region.

4. The memory system according to claim 2, wherein the controller selects memory regions having a similar storage capacity as source memory regions to be merged into a same destination memory region.

5. The memory system according to claim 1, wherein the controller selects memory regions storing data in the same levels as source memory regions to be merged into a same destination memory region.

6. The memory system according to claim 1, wherein the controller determines a number of the open memory regions based on a size of the file.

7. A memory system, comprising:
a storage medium including a plurality of memory units corresponding to a plurality of physical addresses; and
a controller configured to manage mapping relationships between the physical addresses and logical addresses,
wherein, in response to a mapping change request received from a host device, the controller maps first physical addresses previously mapped to first logical addresses to second logical addresses,
wherein the first logical addresses correspond to key-value pairs having a high level in a log-structured merge (LSM) tree structure, and
wherein the second logical addresses correspond to key-value pairs having a low level in the LSM tree structure.

8. The memory system according to claim 7, wherein the controller un-maps mapping relationships between the first logical addresses and the first physical addresses in response to the mapping change request.

9. The memory system according to claim 7, wherein the controller maintains data stored in memory units corresponding to the first physical addresses in a valid state in response to the mapping change request.

10. The memory system according to claim 7, wherein the controller invalidates data stored in memory units corresponding to second physical addresses mapped to the second logical addresses in response to the mapping change request.

11. The memory system according to claim 7,
wherein the mapping change request includes the first logical addresses and the second logical addresses.

12. A data processing system, comprising:
a storage medium including a plurality of memory regions, wherein each of the plurality of memory regions is a unit selected as a source memory region in which data stored therein moves together in a garbage collection operation;
a controller configured to control the storage medium; and
a host device configured to transmit a write request that includes a key-value pair and a level of the key-value pair to the controller, the level being a level of a file in a predetermined unit in which the key-value pair is included in a log-structured merge (LSM) tree structure,
wherein the controller:
allocates each open memory region of a plurality of open memory regions among the plurality of memory regions to one or more levels; and
stores the key-value pair in an open memory region allocated to the level of the key-value pair in response to the write request, wherein the open memory region does not store a key-value pair having a level other than the one or more levels allocated to the open memory region.

13. The data processing system according to claim 12, wherein the controller determines a storage capacity of each open memory region of the open memory regions based on the one or more levels allocated to the open memory region.

14. The data processing system according to claim 13, wherein, when one or more levels allocated to a first open memory region are lower than one or more levels allocated to a second open memory region, the controller sets a storage capacity of the first open memory region to be larger than a storage capacity of the second open memory region.

15. The data processing system according to claim 13, wherein the controller selects memory regions having a similar storage capacity as source memory regions to be merged into a same destination memory region.

16. The data processing system according to claim 12, wherein the controller selects memory regions storing data in the same levels as source memory regions to be merged into a same destination memory region.

17. The data processing system according to claim 12,
wherein the host device transmits database information to the controller, and
wherein the controller determines a number of the open memory regions and determines the one or more levels allocated to the open memory regions based on the database information.

18. The data processing system according to claim 17, wherein the database information includes a size of the file and a total number of levels included in the LSM tree structure.

19. The data processing system according to claim 12, wherein the storage medium is a NAND flash device or a NOR flash device.

20. The data processing system according to claim 12, wherein the storage medium includes one or more nonvolatile memory devices.

* * * * *